US012289705B2

(12) United States Patent
Nuvvula et al.

(10) Patent No.: US 12,289,705 B2
(45) Date of Patent: Apr. 29, 2025

(54) METHODS AND DEVICES FOR CONFIGURING A CHANNEL AT AN ACCESS POINT (AP)

(71) Applicant: Versa Networks, Inc., Santa Clara, CA (US)

(72) Inventors: Rajesh Kumar Nuvvula, Mountain House, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 421 days.

(21) Appl. No.: 18/072,351

(22) Filed: Nov. 30, 2022

(65) Prior Publication Data
US 2024/0179672 A1    May 30, 2024

(51) Int. Cl.
*H04W 64/00*   (2009.01)
*H04W 8/26*    (2009.01)
*H04W 88/08*   (2009.01)

(52) U.S. Cl.
CPC ........... *H04W 64/003* (2013.01); *H04W 8/26* (2013.01); *H04W 88/08* (2013.01)

(58) Field of Classification Search
CPC .................................................. H04W 64/003
See application file for complete search history.

(56) References Cited

U.S. PATENT DOCUMENTS 9,699,140 B1 *  7/2017  Jiang ................... H04L 61/3015
9,839,038 B2   12/2017  Lin et al.
9,930,670 B2    3/2018  Yi et al.

OTHER PUBLICATIONS

Cisco, "Regulatory Domain Unification for Cisco Wireless LAN Access Points", (2013), 29 pgs.
Juniper Networks, "AX411 Access Point Hardware", (2018), 134 pgs.

* cited by examiner

*Primary Examiner* — Pamit Kaur
(74) *Attorney, Agent, or Firm* — LOZA & LOZA, LLP

(57) ABSTRACT

A non-transitory computer readable medium, a device, and a method for configuring a channel at an access point (AP) are disclosed. In an embodiment, the non-transitory computer readable medium includes instructions for receiving an Internet Protocol (IP) geolocation of an AP at an AP manager, where the IP geolocation indicates a physical location country of the AP, obtaining a configuration of the AP from a configuration database, the configuration of the AP including a configured country, determining whether the physical location country matches the configured country, identifying a common channel when the physical location country of the AP and the configured country of the AP do not match, the common channel including a channel that is authorized for use in both the physical location country and in the configured country, and pushing an indication of the common channel from the AP manager to the AP in a configuration message.

20 Claims, 7 Drawing Sheets

|  | Physical Location Country | | |
|---|---|---|---|
|  | $A_p$<br>36 40 44 48 | $B_p$<br>36 40 44 48 52 56 60 64 | $C_p$<br>36 40 44 48 52 56 60 64 149<br>153 157 161 165 |
| $A_c$<br>36 40 44 48 | 36 40 44 48 | 36 40 44 48 | 36 40 44 48 |
| $B_c$<br>36 40 44 48 52 56 60 64 | 36 40 44 48 | 36 40 44 48 52 56 60 64 | 36 40 44 48 52 56 60 64 |
| $C_c$<br>36 40 44 48 52 56 60 64 149<br>153 157 161 165 | 36 40 44 48 | 36 40 44 48 52 56 60 64 | 36 40 44 48 52 56 60 64 149<br>153 157 161 165 |

Configured Country

(12) United States Patent...

METHODS AND DEVICES FOR CONFIGURING A CHANNEL AT AN ACCESS POINT (AP)

BACKGROUND

When establishing a connection, a device, such as a wireless access point (AP) or a Cloud Service Gateway (CSG), may acquire configuration-related information. The configuration-related information may indicate operating parameters supported by a physical location country of the device. For example, an AP may need to be configured to operate on country-specific radiofrequency (RF) channels. However, the device may have been configured in a location that is different from the physical location country. For example, an AP may be configured to operate using RF channels that are valid for one country, but the AP is actually installed in a country that requires the use of different RF channels. Consequently, operating parameters of a configured country of a device may not match the operating parameters of its physical location country.

SUMMARY

A non-transitory computer readable medium, a device, and a method for configuring a channel at an access point (AP) are disclosed. In an embodiment, the non-transitory computer readable medium includes instructions, which when executed by one or more processes, implement a method comprising receiving an Internet Protocol (IP) geo-location of an AP at an AP manager, where the IP geolocation indicates a physical location country of the AP, obtaining a configuration of the AP from a configuration database, the configuration of the AP including a configured country, determining whether the physical location country of the AP matches the configured country of the AP, identifying a common channel when the physical location country of the AP and the configured country of the AP do not match, the common channel including a channel that is authorized for use in both the physical location country of the AP and in the configured country of the AP, and pushing an indication of the common channel from the AP manager to the AP in a configuration message.

In an embodiment, determining whether the physical location country of the AP matches the configured country of the AP includes comparing, at a comparison database of the AP manager, the physical location country of the AP and the configured country of the AP.

In an embodiment, the common channel is identified from a set of channels supported by both the physical location country of the AP and the configured country of the AP.

In an embodiment, the common channel is automatically identified by the AP manager.

In an embodiment, the common channel is manually identified by a user of the AP manager.

In an embodiment, the physical location country of the AP is a country where the AP is operating.

In an embodiment, the physical location country of the AP supports a predetermined set of channels.

In an embodiment, the configured country of the AP is a country where the AP is configured to operate.

In an embodiment, the configured country of the AP has an associated set of channels supported by the AP.

In an embodiment, the IP geolocation is included in a data set received from the AP.

In an embodiment, the IP geolocation is determined from a two-letter country code included in a data set received from the AP.

In an embodiment, the AP does not have a discoverable Service Set Identifier (SSID) when the physical location country of the AP and the configured country of the AP do not match.

In an embodiment, the AP operates on the common channel after receiving the configuration message from the AP manager.

In an embodiment, the AP has a discoverable SSID when the AP operates on the common channel.

In an embodiment, the AP manager sends a notification to an administrator of the AP when the physical location country of the AP and the configured country of the AP do not match.

In an embodiment, the common channel is within a range of 1-14 for a 2.4 gigahertz (GHz) radio.

In an embodiment, the common channel is within a range of 36-196 for a 5 GHz radio.

In an embodiment, the AP manager operates according to an Institute of Electrical and Electronics Engineers (IEEE) 802.11 communication protocol.

An AP manager for configuring a channel at an AP is also disclosed. In an embodiment, the AP manager includes a communications subsystem, where the communications subsystem is configured to receive an IP geolocation of an AP, the IP geolocation indicating a physical location country of the AP, a processor, where the processor is configured to obtain a configuration of the AP from a configuration database, the configuration of the AP including a configured country, determine whether the physical location country of the AP matches the configured country of the AP, identify a common channel when the physical location country of the AP and the configured country of the AP do not match, the common channel including a channel that is authorized for use in both the physical location country of the AP and in the configured country of the AP, and where the communications subsystem is further configured to push a configuration message to the AP, the configuration message indicating the common channel.

A method for configuring a channel at an AP is also disclosed. In an embodiment, the method includes receiving, at an AP manager, an IP geolocation of an AP, where the IP geolocation indicates a physical location country of the AP, obtaining, by the AP manager, a configuration of the AP from a configuration database, the configuration of the AP including a configured country, determining, by the AP manager, whether the physical location country of the AP matches the configured country of the AP, identifying, by the AP manager, a common channel when the physical location country of the AP and the configured country of the AP do not match, where the common channel includes a channel that is authorized for use in both the physical location country of the AP and in the configured country of the AP, and pushing, by the AP manager to the AP, an indication of the common channel in a configuration message.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 4 is a table of common channels.

Throughout the description, similar reference numbers may be used to identify similar elements.

DETAILED DESCRIPTION

Figure 1:
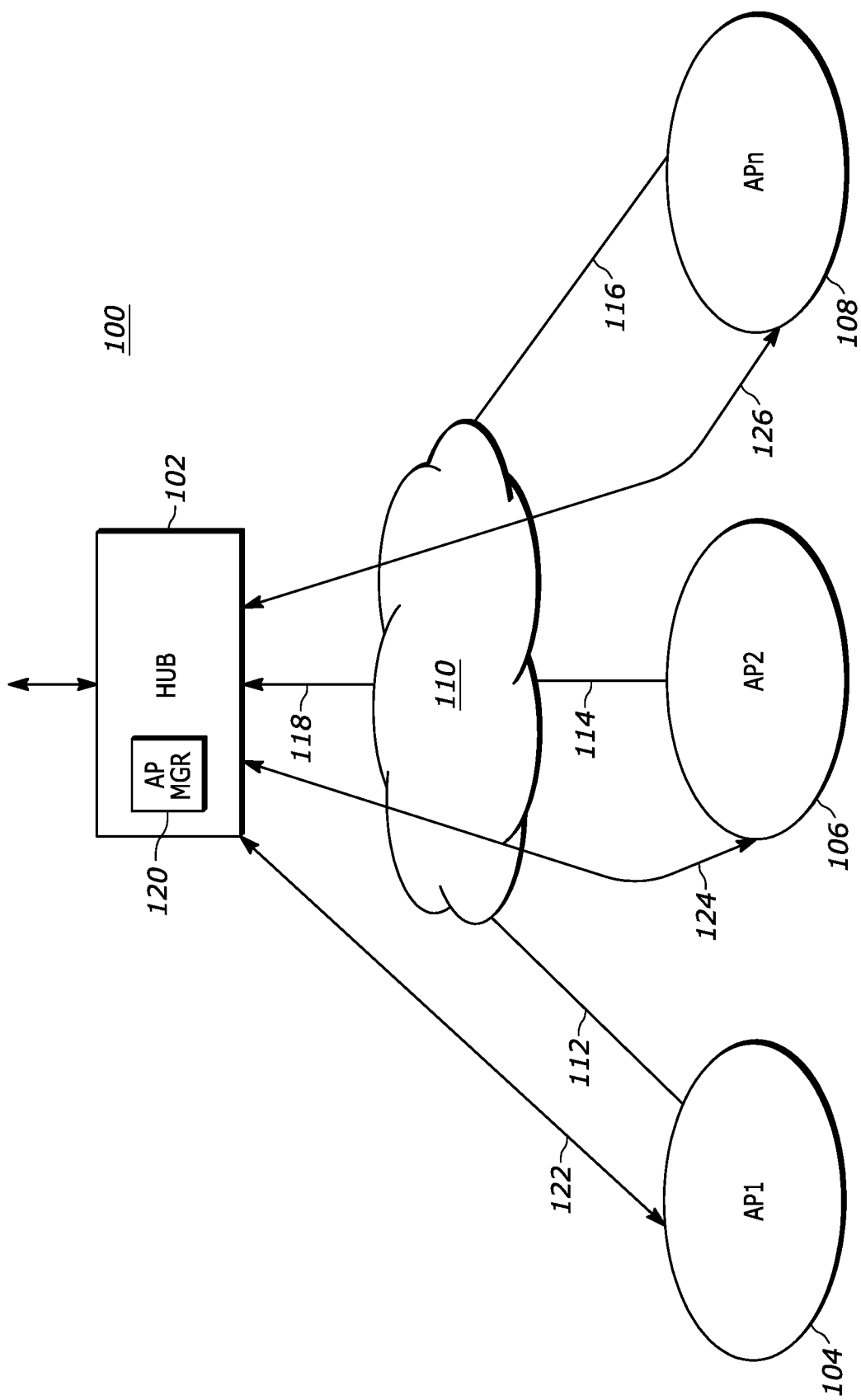
FIG. 1 is a diagram of a network.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The embodiments herein are described in the context of a Software Defined Wide Area Network (SD-WAN or SDWAN) where there is at least one designated hub node for each of the branch nodes and each hub node potentially acting as a gateway to a plurality of branch nodes. Further, branch nodes themselves may have direct access to the Internet through one or more Wide Area Network (WAN) links. However, embodiments disclosed herein can be applied in non-software-defined WANs and for applications hosted within the network, e.g., within a Local Area Network (LAN).

FIG. 1 is a diagram of a network 100 (e.g., a simplified Wi-Fi network) in which a hub 102 communicates with multiple access points (APs) AP1 104, AP2 106 to APn 108 (n represents an integer greater than 2) through a transport domain 110 which may include a LAN or WAN which may be physical or virtualized. Data traffic paths 112, 114, 116 connect between the APs 104, 106, 108 and the transport domain 110 which connects to the hub 102 through another data traffic path 118. Data communications may all be routed through the hub 102 or through the transport domain to other network nodes (not shown). Control connections 122, 124, 126 connect each AP 104, 106, 108 to the hub 102. In some embodiments, the control connection is through a virtual LAN tunnel (VxLAN tunneling).

Using the control connections 122, 124, 126 each AP 104, 106, 108 is able to feed configuration and status data to an AP manager 120 of the hub 102. The AP manager 120 may then tune the configurable settings of each AP 104, 106, 108 using this configuration and status data. The AP manager 120 may operate according to an Institute of Electrical and Electronics Engineers (IEEE) 802.11 communication protocol (e.g., IEEE 802.11be, IEEE 802.11ax, IEEE 802.11az, etc.).

Although the network 100 is shown as including certain components which may perform certain operations and/or are connected in a certain arrangement, the network is not limited to such components, operations, and/or arrangement. For example, the network 100 may include more or less components that perform the same or different operations, and that are connected in the same or different arrangement.

A service set is a group of wireless network devices which are identified by the same service set identifier (SSID) and multiple Wi-Fi APs can provide network access within a service set. In an active-active deployment, two Wi-Fi access points use the same SSID and can both provide network access within the service set. When two access points are deployed near one another, one access point may be the active or preferred access point while the other access point is a redundant or backup device. The deployment being active-active, both access points may be broadcasting Wi-Fi beacons having the same SSID. As such, a wireless client connecting to the service set may connect to either access point. The wireless client does not know which Wi-Fi beacons are from the preferred access point and which are from the redundant access point.

Before an AP is onboarded (e.g., establishes its SSID), the AP may be set to have a configuration that includes, e.g., a configured country and other preconfigured operating parameters of the AP. The configured country may support an associated set of radiofrequency (RF) channels (sometimes referred to herein as "channels") that correspond to predetermined channels of a physical location country where the AP is configured to operate. When the AP is onboarded, it acquires an Internet Protocol (IP) geolocation (sometimes referred to herein as a "geo-IP") that indicates the physical location country of the AP. Consequently, when the configured country of the AP and the physical location country of the AP do not match, a common channel may not be supported.

In accordance with an embodiment of the invention, a non-transitory computer readable medium includes instructions, which when executed by one or more processes, implement a method comprising receiving an IP geolocation of an AP at an AP manager, wherein the IP geolocation indicates a physical location country of the AP, obtaining a configuration of the AP from a configuration database, the configuration of the AP including a configured country, determining whether the physical location country of the AP matches the configured country of the AP, identifying a common channel when the physical location country of the AP and the configured country of the AP do not match, the common channel including a channel that is authorized for use in both the physical location country of the AP and in the configured country of the AP, and pushing an indication of the common channel from the AP manager to the AP in a configuration message.

By identifying the common channel when the configured country and the physical location country do not match, and pushing the indication of the common channel to the AP, the AP is able to operate on the common channel that is authorized for use in both the configured country and the physical location country. When the AP operates on the common channel that is authorized for use in the country where the AP is installed, wireless devices (e.g., client devices) that are near the AP (and which may only be able to operate on the common channel) are able to connect to the AP. Local devices may then be able to communicate with the AP and/or further configure the AP. Additionally, in a large network (SD-WAN) with multiple APs (e.g., more than 100 APs, more than 1,000 APs, etc.), a centralized and automated system to reconcile AP configurations can simplify network management. As such, wireless networks may be established more efficiently.

As described herein, in an embodiment an "IP geolocation" (geo-IP) is acquired by a device (e.g., an AP) when the device connects to a Dynamic Host Configuration Protocol (DHCP) Server. When the device connects to the DHCP Server, the device may also acquire other configuration-related information such as, e.g., an IP address, a subnet mask, a default gateway, etc. The geo-IP indicates a physical location country of the device (e.g., an AP or a Cloud Service Gateway (CSG)). As an example, the geo-IP indicates the physical location country of the device via a two-letter country code and an IP address (e.g., AP_name/XXXX.XXXX.XXXX.XXXX/US) included in a data set received by the device. In some embodiments, once an AP obtains an IP address, an AP manager that is connected to the AP looks up the IP address to determine a country corresponding to the IP address (e.g., using a database containing IP address data).

As described herein, a "physical location country" is a country where a device (e.g., an AP) is operating. When the AP is operating in the physical location country, it may imply that the AP is present in the physical location country, connected to the internet in the physical location country, communicating with other devices in the physical location country, etc. The physical location country supports a predetermined set of channels. The predetermined set of channels are within a range of, e.g., 1-14 for a 2.4 gigahertz (GHz) radio and 36-196 for a 5 GHz radio. Each channel may have a corresponding center frequency (in megahertz (MHz)). The predetermined set of channels may be designated by a country, such that the country determines which channels can be used by/for wireless devices and/or wireless communications, and sets regulations for the allowed channels. As an example, when the physical location country is the United States, the supported predetermined set of channels include 1-11, 36, 40, 44, 48, 52, 56, 60, 64, 100, 104, 108, 112, 116, 120, 124, 128, 132, 136, 140, 149, 153, 157, 161, and 165. As another example, when the physical location country is China, the supported predetermined set of channels include 1-13, 149, 153, 157, 161, and 165.

As described herein, a "configured country" is a country where a device (e.g., an AP or a CSG) is configured to operate. The configured country of the AP may be set (automatically or manually by a user) before the AP is activated (e.g., turned on and/or connected to the internet) and has acquired its geo-IP. The configured country may be part of a configuration of the AP, where the configuration includes other preconfigured operating parameters of the AP. For example, the AP may have a certain configuration when it is placed in packaging for shipment to the location where it is intended to be removed from the packaging and installed. The configured country has an associated set of channels supported by the AP. The associated set of channels are within a range of, e.g., 1-14 for a 2.4 GHz radio and within 36-196 for a 5 GHz radio. Each channel may have a corresponding center frequency (in MHz). As an example, when the configured country of the AP is the United States, the associated set of channels include 1-11, 36, 40, 44, 48, 52, 56, 60, 64, 100, 104, 108, 112, 116, 120, 124, 128, 132, 136, 140, 149, 153, 157, 161, and 165. As another example, when the configured country of the AP is China, the associated set of channels include 1-13, 149, 153, 157, 161, and 165.

In some embodiments, the "physical location country" and/or the "configured country" may correspond to designations other than a country. For example, the physical location country and/or the configured country may correspond to a region, longitude and latitude coordinates, a continent, a state, etc.

As described herein, a "common channel" is a channel that is authorized for use and/or supported in both a physical location country of a device (e.g., an AP or a CSG) and in a configured country of the device. The common channel may be identified from a set of channels supported by both the physical location country of the AP and the configured country of the AP. For example, the common channel is a channel that is included in both the predetermined set of channels of the physical location country and the associated set of channels of the configured country. The common channel may be identified automatically (e.g., via an AP manager) or manually (e.g., via a user).

An example of communications between an AP and an AP manager for configuring a common channel at the AP is described in further detail with reference to FIG. 2.

Figure 2:
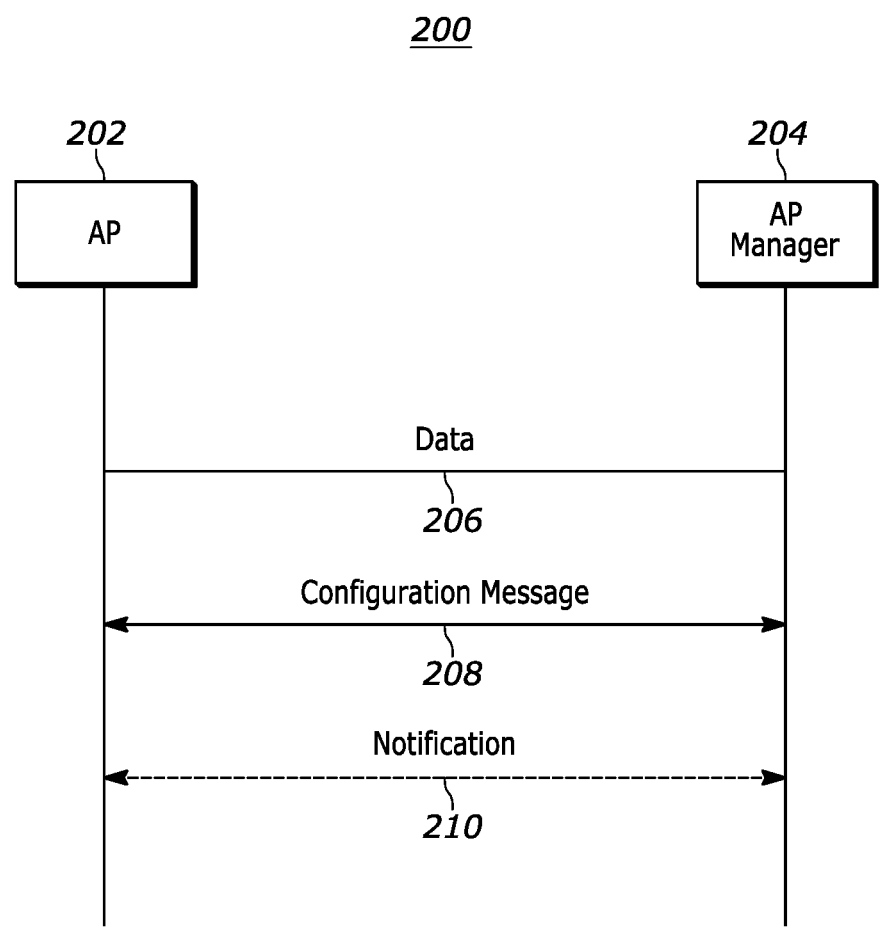
FIG. 2 illustrates communications between an access point (AP) and an AP manager.

FIG. 2 illustrates communications 200 between AP 202 and AP manager 204. AP 202 and AP manager 204 may perform the communications 200 to configure a channel at AP 202. AP 202 may represent an embodiment of AP1 104, AP2 106, or APn 108, and AP manager 204 may represent an embodiment of AP manager 120 (FIG. 1). AP 202 and AP manager 204 may communicate via a control connection (e.g., control connection 122, 124, or 126).

At step 206, AP 202 transmits data to AP manager 204. In an embodiment, the data is a data set that includes a geo-IP of AP 202. AP manager 204 determines a physical location country of AP 202 from the geo-IP of AP 202. The data set may also include other configuration-related data of AP 202. As such, after receiving the data at step 206, AP manager 204 obtains a configuration of AP 202 from a configuration database using the other configuration-related data, such that the configuration includes a configured country of AP 202. AP manager 204 then determines whether the physical location country of AP 202 matches the configured country of AP 202. When the physical location country of AP 202 and the configured country of AP 202 do not match, AP manager 204 identifies a common channel. The common channel may include a channel that is authorized for use in both the physical location country of AP 202 and in the configured country of AP 202. Additionally, when the physical location country of AP 202 and the configured country of AP 202 do not match, AP 202 does not have a discoverable SSID because it may not be operating on a common channel. When AP 202 does not have the discoverable SSID, client devices may not be able to discover and/or connect to the AP.

At step 208, AP manager 204 pushes a configuration message to AP 202 that indicates the common channel identified by AP manager 204, and that reconciles the AP's configuration. AP 202 operates on the common channel after receiving the configuration message from AP manager 204. As an example, AP 202 may automatically start operating on the common channel after receiving the configuration message. In an embodiment, AP 202 has a discoverable SSID when AP 202 operates on the common channel. When AP 202 has the discoverable SSID, client devices may be able to discover and/or connect to the AP.

At step 210, AP manager 204 may optionally send a notification to AP 202. The notification may be sent to an administrator of AP 202 when the physical location country of AP 202 and the configured country of AP 202 do not match. As an example, the notification is an alert message that indicates (to the administrator) to change a country code (e.g., configured country) of AP 202 according to the physical location country of AP 202. In such an example, the country code may be changed by (automatically or manually) updating a configuration parameter of the AP, such that the configured country of the AP is updated to match the physical location country of the AP. In some embodiments, the country code is changed automatically (e.g., via AP 202) or manually (e.g., via the administrator of AP 202).

Although the communications 200 are shown as including one AP 202 and one AP manager 204, the communications may also involve more than one AP and/or more than one AP manager 204. Additionally, the communications 200 may also involve more transmissions between AP 202 and AP manager 204 to perform the same or similar operations.

An example of AP manager operations for configuring a channel at an AP is described in further detail with reference to FIG. 3.

Figure 3:
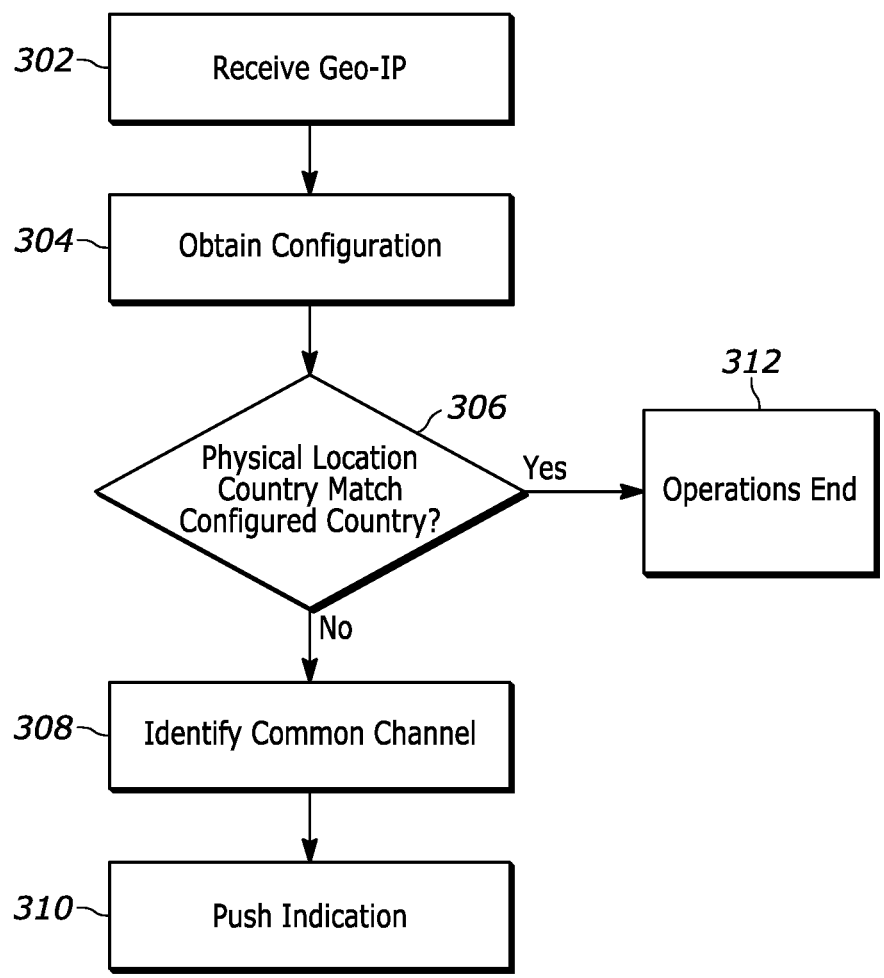
FIG. 3 is a process flow diagram of AP manager operations for configuring a channel at an AP.

FIG. 3 is a process flow diagram of AP manager operations 300 for configuring a channel at an AP. The AP manager operations 300 may be performed by an AP manager (e.g., AP manager 120 (FIG. 1) or AP manager 204 (FIG. 2)) when communicating with an AP (e.g., AP1 104, AP2 106, and/or APn 108 (FIG. 1) or AP 202 (FIG. 2)).

At block 302, the AP manager receives a geo-IP of the AP, where the geo-IP indicates a physical location country of the AP. In an embodiment, the geo-IP is included in a data set received from the AP (e.g., data at step 206 (FIG. 2)), such that the geo-IP indicates the physical location country of the AP via a two-letter country code included in the data set. As such, the AP manager determines the physical location country of the AP using the geo-IP of the AP.

At block 304, the AP manager obtains a configuration of the AP from a configuration database, where the configuration of the AP includes a configured country. The configuration of the AP may be included in the data set received from the AP (e.g., data 206 (FIG. 2)).

At decision point 306, the AP manager determines whether the physical location country of the AP matches the configured country of the AP. In an embodiment, determining whether the physical location country matches the configured country includes comparing, at a comparison database of the AP manager, the physical location country of the AP and the configured country of the AP. When the physical location country of the AP and the configuration country of the AP match (shown by "Yes"), the AP manager operations end at block 312. When the physical location country of the AP and the configuration country of the AP do not match (shown by "No"), the AP manager identifies a common channel at step 308.

If the physical location country of the AP and the configuration country of the AP do not match, then at step 308, the AP manager identifies a common channel that includes a channel that is authorized for use in both the physical location country of the AP and in the configured country of the AP. In an embodiment, the common channel is identified from a set of channels supported by both the physical location country of the AP and the configured country of the AP. The common channel may be automatically identified by the AP manager or manually identified by a user of the AP manager.

At step 310, the AP manager pushes an indication of the common channel to the AP in a configuration message (e.g., configuration message at step 208 (FIG. 2)) to reconcile the configuration of the AP. In an embodiment, the AP operates on the common channel after receiving the configuration message from the AP manager. By operating on the common channel, the AP is discoverable by local wireless devices that may only be able to operate on channels authorized for use in the physical location country.

Although not shown, in some embodiments, the AP manager sends a notification to an administrator of the AP after pushing the indication of the common channel (e.g., notification at step 210 (FIG. 2)). In such an embodiment, the AP manager sends the notification when the physical location country of the AP and the configured country of the AP do not match.

Additionally, although the AP manager operations 300 are shown as including certain steps in a certain arrangement, the AP manager operations are not limited to such steps/arrangement. For example, the AP manager operations 300 may involve more or less steps in the same or different arrangement to perform the same or similar operations.

An example of common channels authorized for use in both a physical location country and a configured country is described in further detail with reference to FIG. 4.

FIG. 4 is a table 400 of common channels. The common channels included in the table 400 are determined from a comparison between a predetermined set of channels of a physical location country (shown by columns) and an associated set of channels of a configured country (shown by rows). The common channel(s) of the table 400 may be pre-established, or can be determined automatically.

The table 400 includes three physical location countries: $A_p$, $B_p$, and $C_p$. $A_p$ supports a predetermined set of channels that include 36, 40, 44, and 48. $B_p$, supports a predetermined set of channels that include 36, 40, 44, 48, 52, 56, 60, and 64. $C_p$ supports a predetermined set of channels that include 36, 40, 44, 48, 52, 56, 60, 64, 149, 153, 157, 161, and 165.

The table 400 also includes three configured countries: $A_c$, $B_c$, and $C_c$. The configured countries $A_c$, $B_c$, and $C_c$ have an associated set of channels that correspond to the predetermined set of channels of the physical location countries $A_p$, $B_p$, and $C_p$, respectively. $A_c$ supports an associated set of channels that include 36, 40, 44, and 48. $B_c$ supports an associated set of channels that include 36, 40, 44, 48, 52, 56, 60, and 64. $C_c$ supports an associated set of channels that include 36, 40, 44, 48, 52, 56, 60, 64, 149, 153, 157, 161, and 165.

In an embodiment, when the configured country matches the physical location country, the common channel can be one or more of the channels authorized for use in both the configured country and in the physical location country. As an example, when an AP with the configured country of $A_c$ is in the physical location country $A_p$, the AP manager can select 36, 40, 44, and/or 48 as the common channel. As another example, when an AP with the configured country of $B_c$ is in the physical location country $B_p$, the AP manager can select 36, 40, 44, 48, 52, 56, 60 and/or 64 as the common channel.

In another embodiment, when the configured country does not match the physical location country, the common channel is identified from channels authorized for use in both the configured country and in the physical location country. As an example, when an AP with the configured country of $A_c$ is in the physical location country $B_p$ or $C_p$, the AP manager can keep 36, 40, 44, and/or 48 as the common channel. As another example, when an AP with the configured country of $B_c$ is in the physical location country $C_p$, the AP manager can keep 36, 40, 44, 48, 52, 56, 60 and/or 64 as the common channel.

Although the table 400 is shown as including three physical location countries and three configuration countries, the table 400 may also include more or less than three physical location countries and/or configuration countries. For example, the number of physical location countries and/or configuration countries may correspond to a number of countries which have established a predetermined set of channels for wireless networks. Additionally, although the three physical location countries and the three configuration countries are shown as having certain predetermined set of channels and associated set of channels, respectively, the physical location countries and the configuration countries are not limited to such channels. For example, the predetermined set of channels and the associated set of channels may correspond to channels supported by, e.g., China, Italy, France, etc.

An example of an AP manager is described in further detail with reference to FIG. 5.

Figure 5:
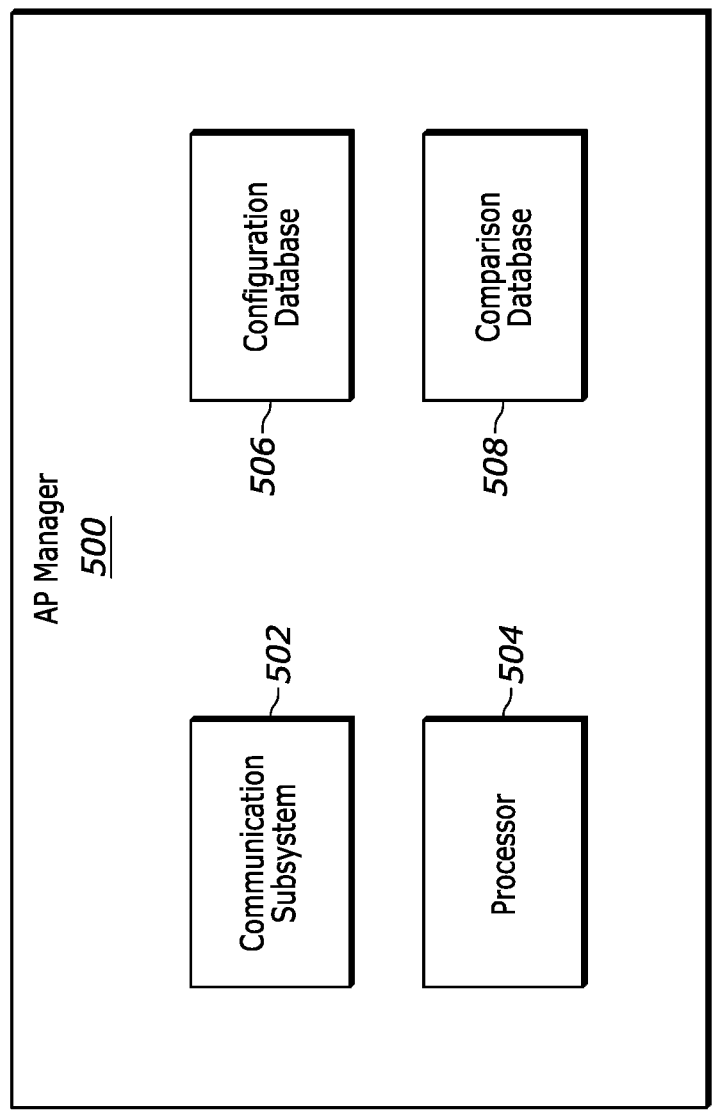
FIG. 5 is a diagram of an AP manager.

FIG. 5 is a diagram of an AP manager 500. The AP manager 500 represents an embodiment of AP manager 120 (FIG. 1) and AP manager 204 (FIG. 2), and may be configured to perform the AP manager operations 300 (FIG. 3). The AP manager 500 includes a communications subsystem 502, a processor 504, a configuration database 506, and a comparison database 508.

The communications subsystem 502 is configured to transmit/receive data to/from an AP. For example, the communications subsystem 502 is configured to receive an IP geolocation of an AP and to push a configuration message to the AP. In such an example, the configuration message indicates a common channel for the AP to reconcile its configuration.

The processor 504 is configured to obtain a configuration of the AP from the configuration database 506, such that the configuration of the AP includes a configured country. The processor 504 is further configured to determine whether the physical location country of the AP matches the configured country of the AP. In an embodiment, determining whether the physical location country of the AP matches the configured country of the AP involves using the comparison database 508, such that the comparison database 508 compares the physical location country of the AP and the configured country of the AP. The processor 504 is further configured to identify a common channel when the physical location country of the AP and the configured country of the AP do not match, where the common channel includes a channel that is authorized for use in both the physical location country of the AP and in the configured country of the AP.

The configuration database 506 is configured to store and/or to provide configuration-related data. As an example, the configuration-related data includes a configured country, an operating frequency (e.g., a 5 GHz radio or a 2.4 GHz radio), a channel width (e.g., 20 MHz, 40 MHz, 80 MHz, 160 MHz, etc.), and a channel identifier (e.g., a channel number).

The comparison database 508 is configured to compare the physical location country of the AP and the configured country of the AP. As an example, the comparison database 508 may automate the process of identifying the common channel for an AP by using the table 400 (FIG. 4). In such an example, the comparison database automates the identification by determining whether the physical location country of the AP and the configured country of the AP match, and providing the common channel (to the processor 504) when the physical location country of the AP and the configured country of the AP do not match.

Although AP manager 500 is shown as including certain components that perform certain operations, AP manager is not limited to such components and/or operations. For example, AP manager 500 may include more or less components that perform the same or different operations.

An example of an AP is described in further detail with reference to FIG. 6.

Figure 6:
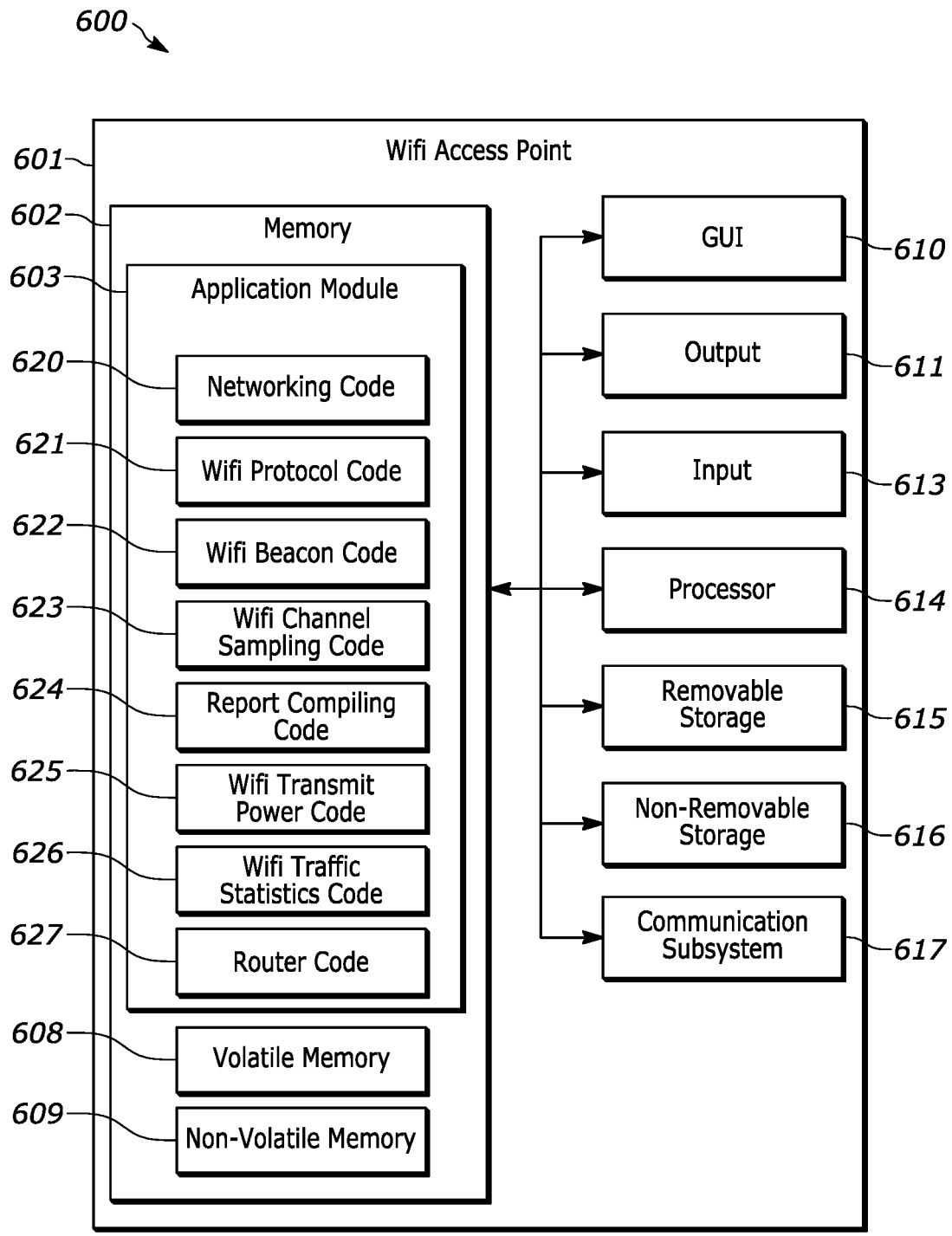
FIG. 6 is a diagram of an AP or an AP manager.

FIG. 6 is a high-level block diagram 600 of an AP 601 in which aspects of sending and/or receiving data and/or messages may be implemented. The hub 102 and AP manager 120 may have the same or a similar structure. In some embodiments, the hub supports only wired communications instead of wired and wireless, depending on the implementation. The hub may include the AP manager within the application module 603. A computing device in the form of the AP 601, configured to interface with controllers, peripheral devices, and other elements disclosed herein, may include one or more processing units 614, memory 602, removable storage 615, and non-removable storage 616. Memory 602 may include volatile memory 608 and non-volatile memory 609. The AP 601 may include or have access to a computing environment that includes a variety of transitory and non-transitory computer-readable media such as volatile memory 608, non-volatile memory 609, removable storage 615 and non-removable storage 616. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data.

The AP 601 may include, or have access to, a computing environment that includes input 613, output 611, and a communications subsystem 617. The AP 601 may operate in a networked environment using a communications subsystem 617 to connect to one or more remote computers, remote sensors and/or controllers, detection devices, hand-held devices, multi-function devices (MFDs), speakers, mobile devices, tablet devices, mobile phones, smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 611 can be provided as an interface to a computer monitor or flat panel display but may include any output device. Output 611 and/or input 613 may include a data collection apparatus associated with AP 601. In addition, input 613, which can include an interface to a computer keyboard and/or pointing device such as a computer mouse, computer track pad, touch screen, or the like, allows a user to provide inputs to AP 601. A user interface can be provided using output 611 and input 613. Output 611 may include a GUI (graphical user interface) 610. A GUI can be responsive of user inputs entered through input 613 and typically displays images and data via GUI 610. Output 611 can be provided as a web page served via the communications subsystem 617 to a device for display to a user and for receiving inputs from the user. The web page can include GUI 610.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device such as, for example, a pointing device such as a mouse, and/or with a keyboard. A particular item can function in the same manner to the user in all applications because the GUI provides standard software routines (e.g., the application module 603 can include program code in executable instructions, including such software routines) to handle these elements and report the user's actions. The GUI can be a web interface output via the communications subsystem 617 to a device that displays the GUI, receives inputs, and provides the inputs to the AP 601 via the communications subsystem 617.

Computer-readable instructions, for example, program code in application module 603, can include or be representative of software routines, software subroutines, software objects, etc. described herein, are stored on a computer-readable medium and are executable by the processor device (also called a processing unit) 614 of AP 601. The application module 603 can include computer code such as networking code 620, Wi-Fi protocol code 621, Wi-Fi beacon code 622, Wi-Fi channel sampling code 623, report compiling code 624, Wi-Fi transmit power code 625, Wi-Fi traffic statistics code 626, and router code 627. A hard drive, CD-ROM, RAM, Flash Memory, and a USB (Universal Serial Bus) drive are just some examples of articles including a computer-readable medium.

In the case of the hub and AP manager, the report compiling code 624 may be configured to deparse and aggregate the report received from APs through the communication subsystem 617. The Wi-Fi transmit power code 626 may be configured to determine transmit power adjustments for the connected APs. The Wi-Fi traffic statistics code 626 may be configured to compile traffic statistics for all of the connected APs and generate insights for use in determining transmit power adjustments, among other purposes.

Figure 7:
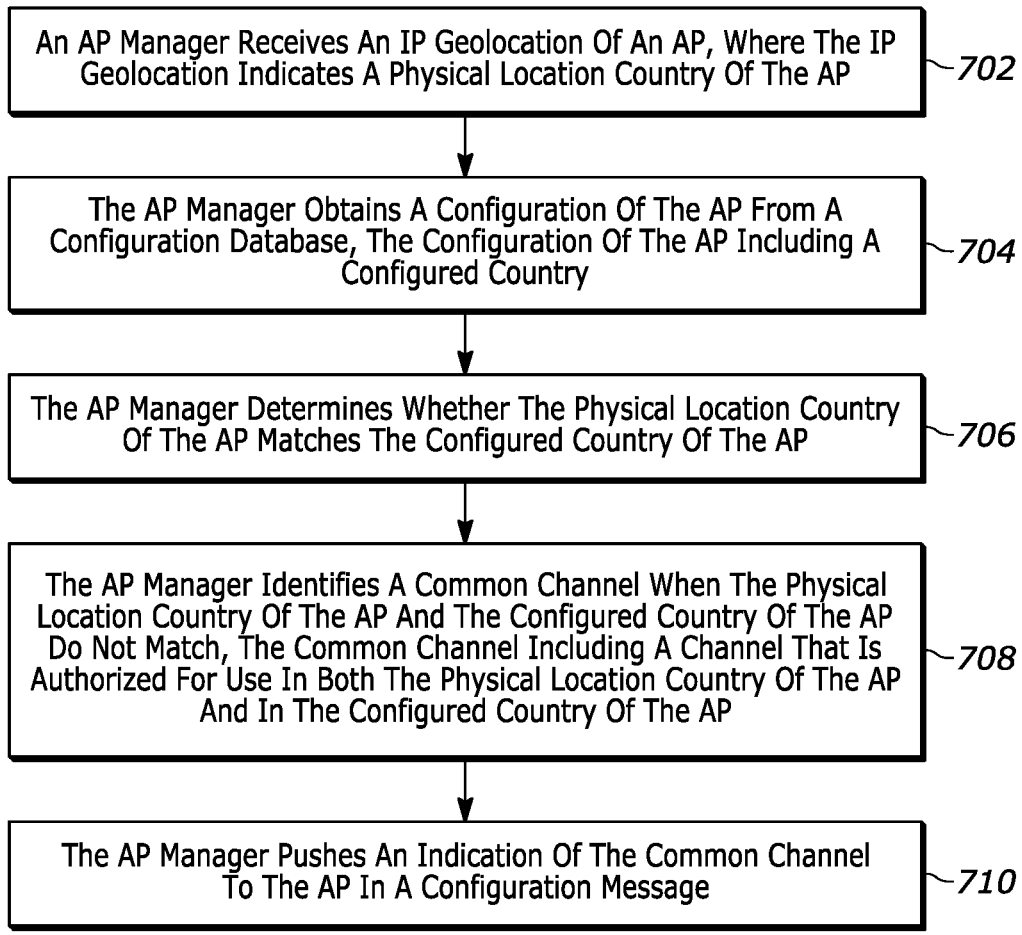
FIG. 7 illustrates a flow diagram of a technique for configuring a channel at an AP in accordance with an embodiment of the invention.

FIG. 7 illustrates a flow diagram of a technique for configuring a channel at an AP in accordance with an embodiment of the invention. At block 702, an AP manager receives an IP geolocation of an AP, where the IP geolocation indicates a physical location country of the AP. At block 704, the AP manager obtains a configuration of the AP from a configuration database, the configuration of the AP including a configured country. At block 706, the AP manager determines whether the physical location country of the AP matches the configured country of the AP. At block 708, the AP manager identifies a common channel when the physical location country of the AP and the configured country of the AP do not match, the common channel including a channel that is authorized for use in both the physical location country of the AP and in the configured country of the AP. At block 710, the AP manager pushes an indication of the common channel to the AP in a configuration message.

In some embodiments, the technique for configuring a channel at an AP is performed by an AP manager. For example, the AP manager includes a communications subsystem, where the communications subsystem is configured to receive an IP geolocation of an AP, the IP geolocation indicating a physical location country of the AP, a processor, where the processor is configured to obtain a configuration of the AP from a configuration database, the configuration of the AP including a configured country, determine whether the physical location country of the AP matches the configured country of the AP, identify a common channel when the physical location country of the AP and the configured country of the AP do not match, the common channel including a channel that is authorized for use in both the physical location country of the AP and in the configured country of the AP, and where the communications subsystem is further configured to push a configuration message to the AP, the configuration message indicating the common channel.

In some embodiments, a technique for configuring a channel at an AP includes receiving, at an AP manager, an IP geolocation of an AP, where the IP geolocation indicates a physical location country of the AP, obtaining, by the AP manager, a configuration of the AP from a configuration database, the configuration of the AP including a configured country, determining, by the AP manager, whether the physical location country of the AP matches the configured country of the AP, identifying, by the AP manager, a common channel when the physical location country of the AP and the configured country of the AP do not match, where the common channel includes a channel that is authorized for use in both the physical location country of the AP and in the configured country of the AP, and pushing, by the AP manager to the AP, an indication of the common channel in a configuration message.

The embodiments disclosed herein can be implemented through at least one software program running on at least one hardware device and performing network management functions to control the network elements. The network elements shown in FIG. 5 and/or FIG. 6 include blocks which can be at least one of a hardware device, or a combination of a hardware device and a software module. It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

In an embodiment, the functionality described above is performed by a computer device that executes computer readable instructions (software). Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g., a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A non-transitory computer readable medium comprising instructions, which when executed by one or more processes, implement a method comprising:
    receiving an Internet Protocol (IP) geolocation of an access point (AP) at an AP manager, wherein the IP geolocation indicates a physical location country of the AP;
    obtaining a configuration of the AP from a configuration database, the configuration of the AP including a configured country;
    determining whether the physical location country of the AP matches the configured country of the AP;
    identifying a common channel when the physical location country of the AP and the configured country of the AP do not match, the common channel including a channel that is authorized for use in both the physical location country of the AP and in the configured country of the AP; and
    pushing an indication of the common channel from the AP manager to the AP in a configuration message.

2. The non-transitory computer readable medium of claim 1, wherein determining whether the physical location country of the AP matches the configured country of the AP includes:
    comparing, at a comparison database of the AP manager, the physical location country of the AP and the configured country of the AP.

3. The non-transitory computer readable medium of claim 1, wherein the common channel is identified from a set of channels supported by both the physical location country of the AP and the configured country of the AP.

4. The non-transitory computer readable medium of claim 1, wherein the common channel is automatically identified by the AP manager.

5. The non-transitory computer readable medium of claim 1, wherein the common channel is manually identified by a user of the AP manager.

6. The non-transitory computer readable medium of claim 1, wherein the physical location country of the AP is a country where the AP is operating.

7. The non-transitory computer readable medium of claim 1, wherein the physical location country of the AP supports a predetermined set of channels.

8. The non-transitory computer readable medium of claim 1, wherein the configured country of the AP is a country where the AP is configured to operate.

9. The non-transitory computer readable medium of claim 1, wherein the configured country of the AP has an associated set of channels supported by the AP.

10. The non-transitory computer readable medium of claim 1, wherein the IP geolocation is included in a data set received from the AP.

11. The non-transitory computer readable medium of claim 1, wherein the IP geolocation is determined from a two-letter country code included in a data set received from the AP.

12. The non-transitory computer readable medium of claim 1, wherein the AP does not have a discoverable Service Set Identifier (SSID) when the physical location country of the AP and the configured country of the AP do not match.

13. The non-transitory computer readable medium of claim 1, wherein the AP operates on the common channel after receiving the configuration message from the AP manager.

14. The non-transitory computer readable medium of claim 13, wherein the AP has a discoverable SSID when the AP operates on the common channel.

15. The non-transitory computer readable medium of claim 1, wherein the AP manager sends a notification to an administrator of the AP when the physical location country of the AP and the configured country of the AP do not match.

16. The non-transitory computer readable medium of claim 1, wherein the common channel is within a range of 1-14 for a 2.4 gigahertz (GHz) radio.

17. The non-transitory computer readable medium of claim 1, wherein the common channel is within a range of 36-196 for a 5 GHz radio.

18. The non-transitory computer readable medium of claim 1, wherein the AP manager operates according to an Institute of Electrical and Electronics Engineers (IEEE) 802.11 communication protocol.

19. An access point (AP) manager for configuring a channel at an AP, the AP manager comprising:
- a communications subsystem, wherein the communications subsystem is configured to receive an Internet Protocol (IP) geolocation of an AP, the IP geolocation indicating a physical location country of the AP;
- a processor, wherein the processor is configured to:
  - obtain a configuration of the AP from a configuration database, the configuration of the AP including a configured country;
  - determine whether the physical location country of the AP matches the configured country of the AP;
  - identify a common channel when the physical location country of the AP and the configured country of the AP do not match, the common channel including a channel that is authorized for use in both the physical location country of the AP and in the configured country of the AP; and wherein the communications subsystem is further configured to push a configuration message to the AP, the configuration message indicating the common channel.

20. A method for configuring a channel at an access point (AP), the method comprising:
- receiving, at an AP manager, an Internet Protocol (IP) geolocation of an AP, wherein the IP geolocation indicates a physical location country of the AP;
- obtaining, by the AP manager, a configuration of the AP from a configuration database, the configuration of the AP including a configured country;
- determining, by the AP manager, whether the physical location country of the AP matches the configured country of the AP;
- identifying, by the AP manager, a common channel when the physical location country of the AP and the configured country of the AP do not match, wherein the common channel includes a channel that is authorized for use in both the physical location country of the AP and in the configured country of the AP; and
- pushing, by the AP manager to the AP, an indication of the common channel in a configuration message.

* * * * *